US011095518B2

(12) United States Patent
Zhang et al.

(10) Patent No.: US 11,095,518 B2
(45) Date of Patent: Aug. 17, 2021

(54) DETERMINING VIOLATION OF A NETWORK INVARIANT

(71) Applicant: HEWLETT PACKARD ENTERPRISE DEVELOPMENT LP, Houston, TX (US)

(72) Inventors: Ying Zhang, Palo Alto, CA (US); Jeongkeun Lee, Mountain View, CA (US); Puneet Sharma, Palo Alto, CA (US); Joon-Myung Kang, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/721,274

(22) Filed: Dec. 19, 2019

(65) Prior Publication Data

US 2020/0186429 A1 Jun. 11, 2020

Related U.S. Application Data

(63) Continuation of application No. 15/775,378, filed as application No. PCT/US2015/061890 on Nov. 20, 2015, now Pat. No. 10,541,873.

(51) Int. Cl.
*H04L 12/26* (2006.01)
*H04L 12/46* (2006.01)
(Continued)

(52) U.S. Cl.
CPC ...... *H04L 41/0893* (2013.01); *H04L 41/0681* (2013.01); *H04L 41/5032* (2013.01);
(Continued)

(58) Field of Classification Search
CPC ..... H04L 45/38; H04L 61/1523; H04L 41/12; H04L 47/125; H04L 47/32;
(Continued)

(56) References Cited

U.S. PATENT DOCUMENTS 8,789,135 B1    7/2014 Pani
2002/0112083 A1*  8/2002 Joshi ................. G06F 21/62
                                                    709/248

(Continued)

FOREIGN PATENT DOCUMENTS

EP      3216177 A1    9/2017
WO   2016/072996 A1   5/2016

OTHER PUBLICATIONS

Al-Shaer et al., "Flowchecker: Configuration Analysis and Verification of Federated Openflow Infrastructures", SafeConfig '10: Proceedings of the 3rd ACM workshop on Assurable and usable security configuration, Oct. 2010, pp. 37-44.

(Continued)

*Primary Examiner* — Sai Aung
(74) *Attorney, Agent, or Firm* — Hewlett Packard Enterprise Patent Department

(57) ABSTRACT

Example implementations relate to determining whether network invariants are violated by flow rules to be implemented by the data plane of a network. In an example, a verification module implemented on a device receives a flow rule transmitted from an SDN controller to a switch, the flow rule relating to an event. The module determines whether the flow rule matches any of a plurality of network invariants cached in the device. If determined that the flow rule matches one of the plurality of network invariants, the verification module determines whether the flow rule violates the matched network invariant. If determined that the flow rule does not match any of the plurality of network invariants, the verification module (1) reports the event associated with the flow rule to a policy management module, (2) receives a new network invariant related to the event from the policy management module, and (3) determines whether the flow rule violates the new network (Continued)

invariant. The verification module generates an alarm if determined that the flow rule violates any of the network invariants.

20 Claims, 4 Drawing Sheets

(51) Int. Cl.
*H04L 12/801* (2013.01)
*H04L 12/24* (2006.01)
*H04L 12/813* (2013.01)
*H04L 12/851* (2013.01)
*H04L 12/715* (2013.01)
*H04L 12/721* (2013.01)

(52) U.S. Cl.
CPC .......... *H04L 47/20* (2013.01); *H04L 47/2483* (2013.01); *H04L 45/38* (2013.01); *H04L 45/64* (2013.01)

(58) Field of Classification Search
CPC . H04L 12/4633; H04L 12/4641; H04L 41/14; H04L 43/062; H04L 43/065; H04L 43/0876; H04L 45/02; H04L 47/22; H04L 47/24; H04L 61/1511
See application file for complete search history.

(56) References Cited

U.S. PATENT DOCUMENTS

| | | |
|---|---|---|
| 2005/0276262 A1 | 12/2005 | Schuba et al. |
| 2006/0013136 A1 | 1/2006 | Goldschmidt et al. |
| 2006/0176808 A1 | 8/2006 | Isobe et al. |
| 2010/0235519 A1 | 9/2010 | Hu et al. |
| 2010/0284404 A1* | 11/2010 | Gopinath .............. G06F 9/5005 370/392 |
| 2010/0322071 A1* | 12/2010 | Avdanin ................ H04L 47/215 370/230 |
| 2013/0117847 A1 | 5/2013 | Friedman et al. |
| 2013/0311675 A1 | 11/2013 | Kancherla |
| 2014/0369209 A1 | 12/2014 | Khurshid et al. |
| 2015/0124648 A1 | 5/2015 | Lee et al. |
| 2015/0163151 A1 | 6/2015 | Li |
| 2015/0326425 A1 | 11/2015 | Natarajan et al. |
| 2016/0036636 A1* | 2/2016 | Erickson ............... H04L 41/145 370/248 |
| 2016/0048790 A1 | 2/2016 | Ritter et al. |
| 2016/0080502 A1* | 3/2016 | Yadav .................... H04L 47/22 709/227 |

OTHER PUBLICATIONS

Altukhov et al, "A Runtime Verification System for Software Defined Networks", Tools and Methods of Program Analysis, Nov. 14-15, 2014, pp. 19-45.
Fayaz et al., "Testing Stateful and Dynamic Dataplanes with FlowTest", HotSDN'14, Aug. 22, 2014, 6 pages.
Foster, et al., "Languages for Software-defined Networks", IEEE Communications Magazine, vol. 51, No. 2, Feb. 2013, pp. 128-134.
Handigol et al., "I Know What Your Packet Did Last Hop: Using Packet Histories to Troubleshoot Networks", Proceedings of the 11th USENIX Symposium on Networked Systems Design and Implementation (NSDI '14), Apr. 2-4, 2014, 16 pages.
Kazemian et al., "Header Space Analysis: Static Checking for Networks", In Proceedings of the 9th USENIX Symposium on Networked Systems Design and Implementation (NSDI), Apr. 2012, pp. 1-14.
Kazemian et al., "Real Time Network Policy Checking using Header Space Analysis", In Proceedings of the 10th USENIX Symposium on Networked Systems Design and Implementation (NSDI '13), Apr. 2013, pp. 99-111.
Khurshid et al., "VeriFlow: Verifying Network-Wide Invariants in Real Time", HotSDN'12, Aug. 13, 2012, pp. 49-54.
Search Report and Written Opinion received for PCT Application No. PCT/US15/061890, dated Aug. 19, 2016, 10 pages.
Son et al., "Model Checking Invariant Security Properties in Openflow", 2013 IEEE International Conference on Communications (ICC), 2013, 6 pages.
Xie et al., "On Static Reachability Analysis of IP Networks", In Proceedings—IEEE Infocom, Mar. 2005, pp. 1-14.

* cited by examiner

DETERMINING VIOLATION OF A NETWORK INVARIANT

CROSS-REFERENCE TO RELATED APPLICATIONS

This application is a continuation of U.S. patent application Ser. No. 15/775,378, filed on Nov. 20, 2015, which was a U.S. national stage application of PCT patent application No. PCT/US2015/061890, the entire contents of both which are incorporated by reference herein. Applicant hereby rescinds any disclaimer of claim scope in the parent application or the prosecution history thereof and advises the USPTO that the claims in this application may be broader than any claim in the parent application(s).

BACKGROUND

Networks can include a plurality of resources connected by communication links, and can be used to connect people, provide services (e.g., internally and/or externally via the Internet and/or intranet), and/or organize information, among other activities associated with an entity. An example network can include a software defined network (SDN).

DETAILED DESCRIPTION

Example implementations relate to verifying whether high level policies are being implemented properly in the data plane of a network, such as a software defined network (SDN). In an example, a verification module receives a flow rule transmitted from an SDN controller to a switch. The verification module determines whether the flow rule matches any locally cached network invariants, the network invariants corresponding to high level policies stored in a policy management module. If no match is found, the verification module reports an event associated with the flow rule to the policy management module, which can either install a new network invariant into the verification module according to the event or raise an alarm of policy violation (e.g., if the policy management module determines that the event violates a policy). The new network invariant can apply to a flow space that shares a same policy as a flow associated with the event, such that the new network invariant may be matched to additional flows and corresponding flow rules.

The verification module then determines whether the flow rule violates any of the matched network invariants or alternatively the new network invariant (in the case of no previous matches). An alarm is generated if a violation is detected. In this manner, the verification module is able to detect whether high level policies have been implemented properly in the network. Additionally, the verification module is able to slowly build a cache of network invariants, rather than requiring the verification module to begin with all possible network invariants, which could significantly slow down the operation and efficiency of the verification process.

Figure 1:
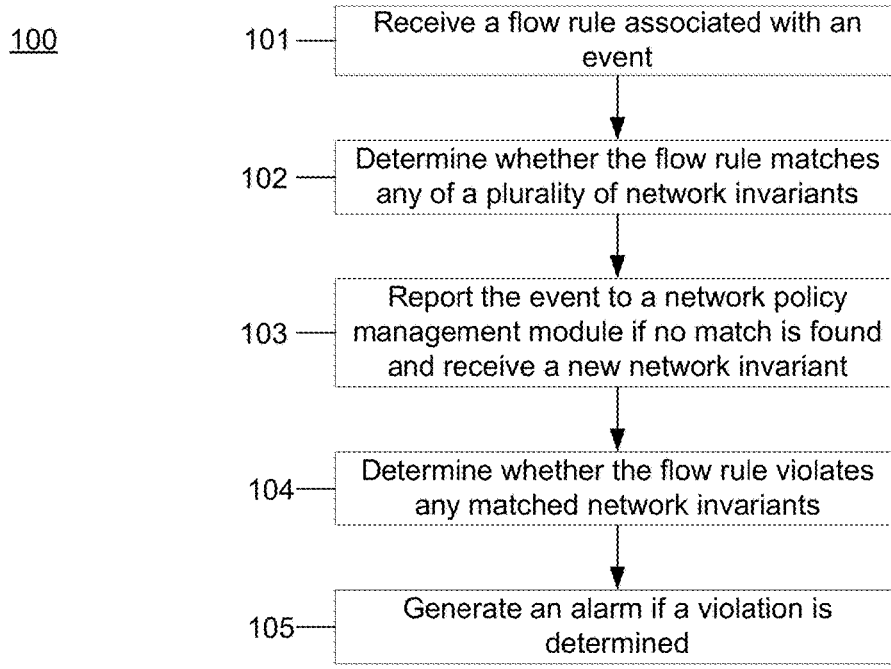
FIG. 1 illustrates a flow chart of an example method for implementing the techniques described herein, according to an example.
Figure 2:
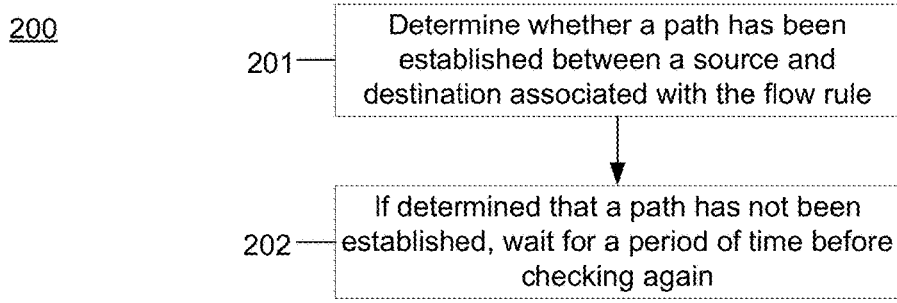
FIG. 2 illustrates a flow chart of an example method for implementing the techniques described herein, according to an example.
Figure 3:
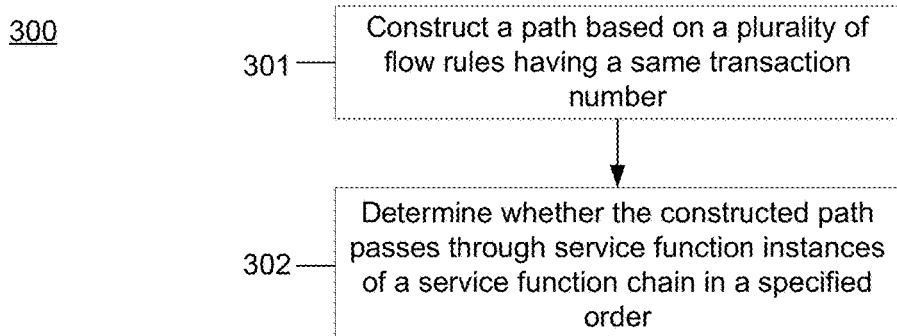
FIG. 3 illustrates a flow chart of an example method for implementing the techniques described herein, according to an example.

FIGS. 1-3 illustrate example methods to implement the techniques described herein, according to various examples. Methods 100, 200, 300 may be performed by a computing device, computer, server, or the like, such as a device implementing verification module 430 or computer 610. Computer-readable instructions for implementing methods 100, 200, 300 may be stored on a computer readable storage medium.

Figure 4:
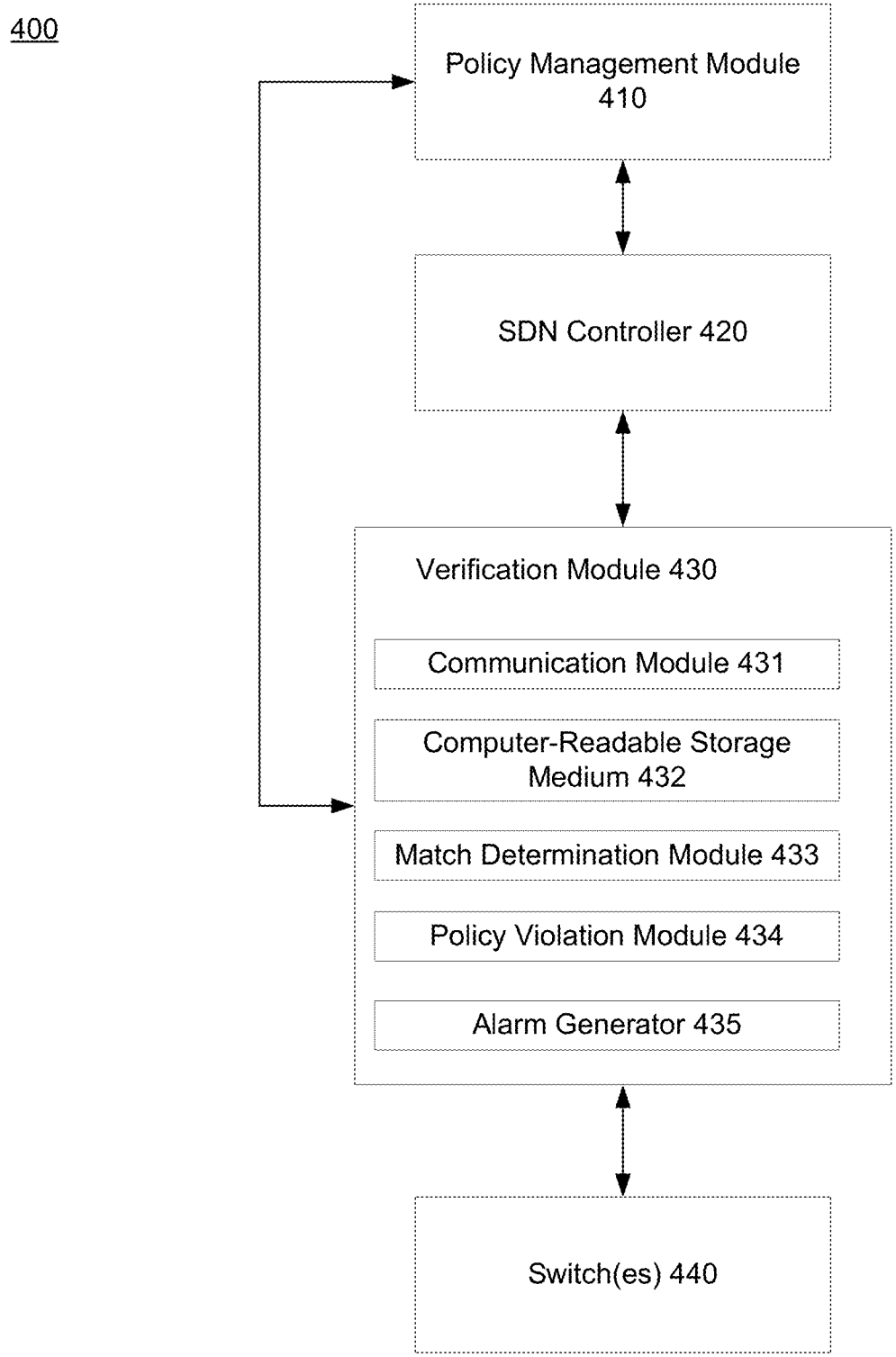
FIG. 4 illustrates an example environment with devices for implementing the techniques described herein, according to an example.

Methods 100, 200, 300 will be described here relative to environment 400 of FIG. 4. Environment 400 may include policy management module 410, SDN controller 420, verification module 430, and switch(es) 440, all of which are part of a software defined network (SDN). Although the implementations described herein refer to a software defined network, the described techniques could be applied in other types of networks, such as virtual network overlays.

Policy management module 410 and verification module 430 are functional modules that may be implemented by a hardware device, such as a computer. Policy management module may manage high-level network policies to be implemented on the network. The policy management module 410 may manage the high level policies using any of various techniques for policy composition, consolidation, translation, and implementation in network devices (e.g., switch(es) 440). For example, PCT/US2014/064394, filed on Nov. 6, 2014 and entitled "Network Policy Graphs", which is hereby incorporated by reference, describes a graph model to represent and compose policies at the logical level and generate a condensed set of policies to be installed in the network. The high level policies are translated to the low level rules (e.g., flow rules) by an SDN controller (e.g., SDN controller 420), and then installed in the network switches (e.g., switch(es) 440).

Verification module 430 may verify that these high-level network policies are being implemented properly on the network. Verification module 430 may include a communication module 431, a computer-readable storage medium 432 for caching network invariants, a match determination module 433, a policy violation module 434, and an alarm generator 435. These components are described in more detail later.

SDN controller 420 may manage the control plane of a software defined network and may program the data plane of the network. SDN controller 420 may include/be implemented by one or multiple computers. Switch(es) 440 may be network infrastructure devices, such as a switch, router, or other complex network function, of the network and may be part of the data plane of the network. SDN controller 420 may communicate with switch(es) 440 via an SDN protocol, such as the OpenFlow protocol. SDN controller 440 may program rules in the packet processing pipelines of switch(es) 440. Switch(es) 440 may use these rules to process and forward network traffic. Additionally, a variety of SDN applications may run on or interface with SDN controller 440. These SDN applications may be part of the application plane of the software defined network.

SDN controller 420, switch(es) 440, and the devices implementing policy management module 410 and verification module 430 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, one or more machine-readable storage media separate from the one or more controllers may also be included.

As already described, in an SDN network the forwarding plane behavior is controlled and managed by the centralized SDN controller, such as SDN controller 420. On top of SDN controller 420, multiple entities (e.g. SDN applications) can influence the behavior of the same set of network devices, such as switch(es) 440, through the SDN controller interface. These different entities may have different goals and internal logics in configuring switch(es) 440. The high level network policies, such as access control of communications, quality of service (QoS) requirements, and network services (which may form a part of a service function chain) may be managed and consolidated by a dedicated policy management tool, such as policy management module 410. Policy management module 410 controls the set of policies that the network should satisfy, which cannot be overwritten or violated. These high level policies which cannot be violated may be converted into network invariants.

For example, the network invariants may be represented in white lists (allowed communications), black lists (disallowed communications), and service function chains (required paths through certain service function instances). An example white list network invariant would be an indication that traffic is allowed from one address (e.g., allow traffic from 15.1.1.0/24 to 15.1.2.0/22, using protocol=80). An example blacklist network invariant would be an indication that all traffic from a certain address should be blocked (e.g., block traffic from 15.2.3.0/24 to World, using protocol 22). An example service function chain network invariant would be an indication that traffic from a particular address should traverse certain service function instances (e.g., traffic from 15.1.1.0/24 to 15.1.2.0/22 should traverse a certain firewall, load balancer, and deep packet inspection engine.)

However, since multiple applications or even multiple users in the SDN network may program the same physical network simultaneously, there may be conflicting rules or errors that violate the high level policies/network invariants. Moreover, the SDN controller itself, as a software program, may also contain bugs that can result in misconfiguration of the low level rules for the switches. To address this, the techniques described herein can be used (e.g., by the verification module 430) to check the network behavior at the lower level (i.e., at the level of switches and their forwarding tables) and make sure it complies with the high level policies/network invariants. Furthermore, this checking can be done in real-time as the flow rules are being programmed in the network switches. Upon detection of a violation, an alarm may be generated and sent to the policy management module 410.

Turning to FIG. 1, method 100 may begin at 101, where verification module 430 (e.g., via communication module 431) may receive a flow rule associated with an event. The flow rule may be a flow rule in accordance with the Open Flow protocol generated by SDN controller 420 in response to the event. In an example, the event may be a packet-in event at switch(es) 440, meaning the switch did not have a matching flow rule installed in its flow table for the received packet and so the switch forwarded the event to the SDN controller 420 for handling. As another example, the event may be a flow rule deletion event by the switch(es) 440. Because the verification module 430 sits between the switch(es) 440 and the SDN controller 420, the verification module 430 may monitor and track these events.

In the case of a packet-in event, the flow rule may be the SDN controller's 420 instruction to the switch(es) 440 to install a flow table entry in its flow table in accordance with the flow rule, which flow table entry may be used to forward the received packet (and any subsequently received packets corresponding to that flow). The SDN controller 420 may determine the policy action (allow, deny, service chain routing, etc.) for the event based on its internal logic and also any applicable policy stored in the policy management module 410. The controller generates flow rules based on the policy action. Because the policy actions are high-level and logical, the controller needs a mapping between the logical resources (specified by the policy action) to the physical resources (the actual network devices, such as switch(es) 440 and any service function instances) to generate appropriate flow rules for the switch(es) 440. This mapping may be stored in a mapping database, which can be a part of the SDN controller 420 or a separate entity. The SDN controller uses the mapping database to generate flow rules that correctly implement the logical policy actions on the physical network infrastructure (e.g., switch(es) 440). Verification module 430 may then intercept the flow rules in order to verify that the flow rule does not violate any network invariants.

At 102, verification module 430 (e.g., via match determination module 433) may determine whether the flow rule matches any of a plurality of network invariants. The verification module 430 may attempt to match the flow rule to network invariants cached in local memory, such as computer-readable storage medium 432. These network invariants may have been previously transferred to verification module 430 from policy management module 410.

At 103, if no match to a locally stored network invariant is found, verification module 430 may report the event corresponding to the flow rule to the policy management module 410. The policy management module 410 may examine the event and send to verification module 430 a new network invariant that applies to the event and other related future events. The policy management module 410 may examine the high level policies for the network and identify a network invariant that applies to the event.

For example, if communication between the source and destination associated with the packet-in event is allowed, the policy management module 410 may send a white list network invariant indicating that communication is allowed. In some examples, the policy management module 410 may identify a network invariant that applies to a larger flow space than just the flow associated with the event, such that the network invariant will match to a larger set of flows (thus cutting down on the number of times that verification module 430 needs to request new network invariants from the policy management module 410). In another example, if the policy management module 410 determines that the flow associated with the packet-in event should traverse a certain service function chain through the network, the policy management module 410 may provide the service function chain as a network invariant to verification module 430. Upon receiving the new network invariant, verification module 430 may cache the new network invariant in computer-readable storage medium 432 along with the other stored network invariants.

At 104, verification module 430 (e.g., via policy violation module 434) may determine whether the flow rule violates either any of the locally cached, matched network invariants or the new network invariant received from the policy management module (whichever the case may be). At 105, if determined that the flow rule violates a network invariant, that means that the SDN controller has attempted to configure the switch(es) 440 in a way that will violate a high level policy in the network. Accordingly, verification module 430 may generate an alarm. The alarm may be sent to the policy management module 410 and/or the SDN controller 420, which may take action to prevent the network for implementing the improper flow rule. On the other hand, if no violation is detected, the verification module 430 does not need to take any action.

FIG. 2 illustrates additional processing that may be performed in conjunction with method 100, in which connectivity between the source and destination are checked. At 201, prior to determining whether a received flow rule violates a matched network invariant, verification module 430 first may determine whether a path has been established between a source and destination associated with the flow rule/event. If the path has been established, there is connectivity between the source and destination and the remaining steps of method 100 may be performed. At 202, if determined that a path has not yet been established, the verification module 430 may wait for a period of time specified in a timeout before checking again whether the path has been established. The timeout value may be the maximum duration that it takes to install flow rules on a series of switches in a path. If determined that a path has still not been established, the verification module 430 may raise an alarm to policy management module 410 and/or SDN controller 420 that a "blackhole" condition may be present, meaning that a path hasn't been fully established for the flow, resulting in the flow never being able to reach its destination.

In another example, reliance on a timeout may be eliminated by having the SDN controller 420 directly signal the set of flow rules belonging to the same policy. The reason for using a timeout is because a policy action for an event usually consists of a set of flow rules to be installed on the switch(es) 440. For example, setting up a path to allow the communication between a pair of hosts involves installing multiple flow rules on a sequence of switches along the path. If the connectivity is checked for every flow rule passing through the verification module 430, false alarms of blackholing may be raised when the actual problem is that the subsequent rules in the set have not yet been installed in the switch(es) 440. The timeout threshold is used to prevent such temporary false alarms being sent out. While this technique is simple, it may introduce delay in alarm raising. Additionally, it may still have false alarms if the timeout threshold is not set properly.

Instead, a controller-assisted approach. Since the SDN controller 420 knows the set of rules associated with each policy update, it can mark the set of flow rules with a transaction number. The verification module 430 may then batch the flow rules with the same transaction number, and then check the connectivity at once for all the flow rules for the same policy. While this method requires support from the SDN controller 420, it is more accurate and can reduce the processing overhead in the verification module 430.

FIG. 3 illustrates a method 300 for checking whether a service function chain policy is implemented properly in the network, according to an example. At 301, the verification module 430 may construct a path based on a plurality of received flow rules having a same transaction number (e.g., leveraging the controller-assisted approach just described). At 302, the verification module 430 may determine whether the constructed path passes through all of the service function instances of a matched service function chain policy (a type of network invariant) in the specified order. If the path does not follow the service function chain policy, the verification module 430 may generate an alarm and report it to the policy management module 410 and/or SDN controller 420.

Figure 5A:
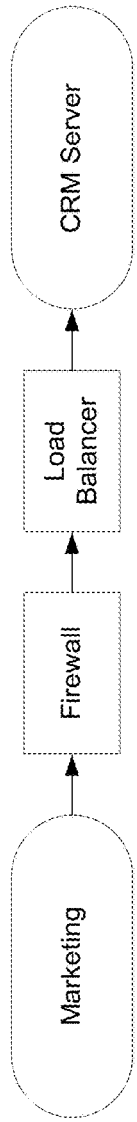
FIGS. 5(a) and 5(b) illustrate an example service function chain verification, according to an example.
Figure 5B:
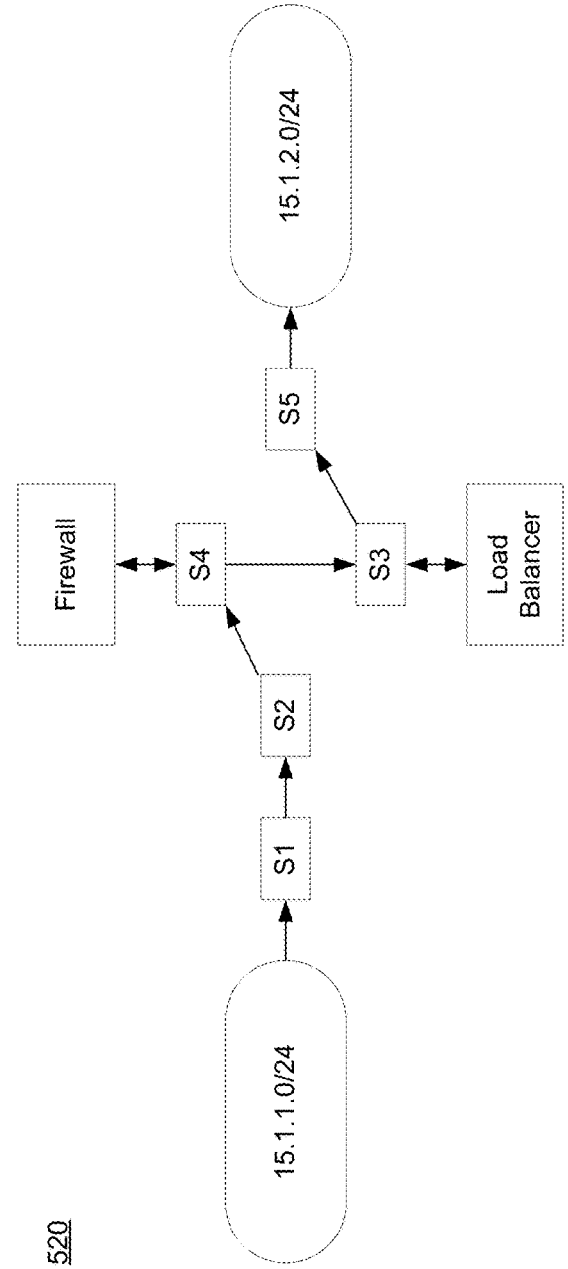

FIGS. 5(a) and 5(b) depict an example. In FIG. 5(a), a policy for a service function chain is shown at a logical level, 510. The policy requires that traffic from "Marketing" to a "CRM Server" traverse a Firewall and a Load Balancer, each of which is a service function instance. FIG. 5(b) shows the logical level policy 510 mapped to the physical layer, 520. The network address for "Marketing" is 15.1.1.0/24 and the network address for the "CRM Server" is 15.1.2.0/24. The intermediate switches S1-S5 connecting the source, destination, and service function instances are also shown. Because the two service function instances are connected to S4 and S3 respectively, verification module 430 verifies that the path for this flow traverses S1, S2, S4, S3 and then finally exits at S5, in that order. The verification module 430 may query the logical-physical mapping database for the physical locations of the service function instances in order to create the physical layer map 520.

Figure 6:
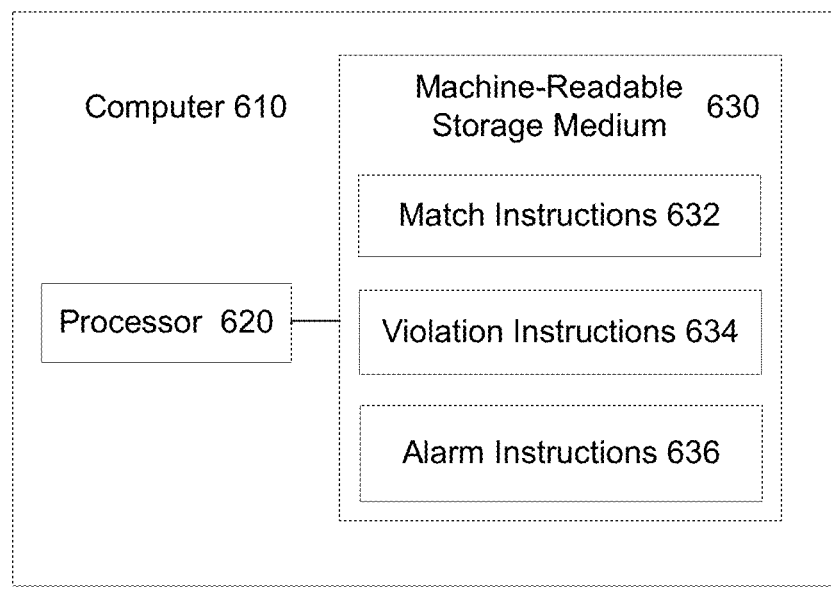
FIG. 6 illustrates an example computer for implementing the techniques described herein, according to an example.

FIG. 6 illustrates a computer to implement the techniques described herein, according to an example. The computer may include one or more controllers and one or more machine-readable storage media, as described with respect to SDN controller 420, for example.

Processor 620 may be at least one central processing unit (CPU), at least one semiconductor-based microprocessor, other hardware devices or processing elements suitable to retrieve and execute instructions stored in machine-readable storage medium 630, or combinations thereof. Processor 620 can include single or multiple cores on a chip, multiple cores across multiple chips, multiple cores across multiple devices, or combinations thereof. Processor 620 may fetch, decode, and execute instructions 632-636 among others, to implement various processing. As an alternative or in addition to retrieving and executing instructions, processor 620 may include at least one integrated circuit (IC), other control logic, other electronic circuits, or combinations thereof that include a number of electronic components for performing the functionality of instructions 632-636. Accordingly, processor 620 may be implemented across multiple processing units, and instructions 632-636 may be implemented by different processing units in different areas of computer 610.

Machine-readable storage medium 630 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 630 can be computer-readable and non-transitory. Machine-readable storage medium 630 may be encoded with a series of executable instructions for managing processing elements.

The instructions 632-636 when executed by processor 620 (e.g., via one processing element or multiple processing elements of the processor) can cause processor 620 to perform processes, for example, methods 100, 200, 300, and/or variations and portions thereof. Instructions 632-636 will now be briefly described, which description should be read in light of the description of methods 100, 200, 300, and environment 400 above.

Computer 610 may verify whether high level policies are being violated in the network. For example, computer 610 may receive a flow rule transmitted from an SDN controller to a switch. The flow rule may related to an event, such as a packet-in event at the switch. Match instructions 632 may cause processor 610 to determine whether the flow rule matches any of a plurality of network invariants stored in the computer-readable storage medium 630. If a match is found, violation instructions 634 may cause processor 620 to determine whether the flow violates the matched network invariant. If no match is found, computer 610 may forward the event to a policy management module, which may send back to computer 630 a new network invariant related to the event. In such a case, violation instructions 634 may cause processor 620 to determine whether the flow rule violates the new network invariant. If a violation is determined, alarm instructions 636 may cause processor 620 to generate an alarm, which may be reported to the policy management module.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" may be an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, this specification merely sets forth some of the many possible embodiments, configurations, and implementations.

What is claimed is:

1. A method by a device for network invariant violation determination, comprising:
   receiving, by the device, a flow rule transmitted from a software defined network (SDN) controller to a switch, the flow rule relating to an event;
   determining, by the device, whether the flow rule matches any of a plurality of network invariants cached in the device;
   if determined that the flow rule does not match any of the network invariants, (1) reporting, by the device, the event associated with the flow rule, (2) receiving, by the device, a new network invariant related to the event associated with the flow rule, and (3) determining, by the device, whether the flow rule violates the new network invariant; and
   generating, by the device, an alarm if determined that the flow rule violates any of the network invariants.

2. The method of claim 1, further comprising caching, by the device, the new network invariant.

3. The method of claim 1, wherein the new network invariant applies to a flow space that shares a same policy as a flow associated with the event.

4. The method of claim 1, further comprising determining, by the device, whether a path has been established between a source and destination associated with the flow rule.

5. The method of claim 4, wherein if initially determined that a path has not been established between the source and destination, waiting, by the device, for a period of time specified by a timeout value and then determining, by the device, whether a path has been established between the source and destination.

6. The method of claim 4, further comprising waiting, by the device, to determine whether a path has been established between the source and destination until a plurality of flow rules marked with a same transaction number as the flow rule are received, wherein the flow rules were marked with the same transaction number by the SDN controller.

7. The method of claim 1, further comprising determining, by the device, whether a service function chain policy specified by a network invariant is implemented correctly by (1) constructing, by the device, a path based on a plurality of flow rules having a same transaction number, and (2) determining, by the device, whether the constructed path passes through service function instances of the service function chain policy in an order specified by the service function chain policy.

8. The method of claim 7, further comprising determining, by the device, physical addresses of the service function instances by querying a logical-to-physical mapping database in the SDN controller, wherein the physical addresses are used to determine whether the path passes through the service function instances in the order specified by the service function chain policy.

9. A device for network invariant violation determination, comprising:
- a processing resource; and
- a machine-readable storage medium comprising instructions executable by the processing resource to:
  - intercept a flow rule transmitted to a switch from a software defined network (SDN) controller, the flow rule relating to an event;
  - store a plurality of network invariants;
  - determine whether the flow rule matches any of the network invariants,
  - if determined that the flow rule does not match any of the network invariants, transmit an event associated with the flow rule to request a new network invariant associated with the event;
  - determine whether the flow rule violates a matched network invariant or the new network invariant; and
  - generate an alarm if any of the network invariants are violated.

10. The device of claim 9, wherein the instructions comprise instructions to determine whether a path has been established between a source and destination associated with the flow rule.

11. The device of claim 10, wherein the instructions to:
- wait to determine whether a path has been established between the source and destination until a plurality of flow rules marked with a same transaction number as the flow rule are received, wherein the flow rules were marked with the same transaction number by the SDN controller.

12. The device of claim 10, wherein the instructions comprise instructions to:
- if initially determined that a path has not been established between the source and destination, wait for a period of time specified by a timeout value and then determine whether a path has been established between the source and destination.

13. The device of claim 9, wherein the instructions comprise instructions to:
- determine whether a service function chain policy specified by a network invariant is implemented correctly by (1) constructing a path based on a plurality of flow rules having a same transaction number, and (2) determining whether the constructed path passes through service function instances of the service function chain policy in an order specified by the service function chain policy.

14. The device of claim 13, wherein the instructions comprise instructions to:
- determine physical addresses of the service function instances by querying a logical-to-physical mapping database in the SDN controller, wherein the physical addresses are used to determine whether the path passes through the service function instances in the order specified by the service function chain policy.

15. A non-transitory computer-readable storage medium storing instructions that, when executed by a processor, cause the processor to:
- receive a flow rule transmitted from a software defined network (SDN) controller to a switch, the flow rule relating to an event;
- determine whether the flow rule matches any of a plurality of network invariants;
- if determined that the flow rule matches one of the plurality of network invariants, determine whether the flow rule violates the matched network invariant;
- if determined that the flow rule does not match any of the plurality of network invariants, receive a new network invariant related to the event, and determine whether the flow rule violates the new network invariant; and
- generate an alarm if determined that the flow rule violates any of the network invariants.

16. The non-transitory computer-readable storage medium of claim 15, wherein the instructions comprise instructions that, when executed by the processor, cause the processor to:
- determine whether a path has been established between a source and destination associated with the flow rule.

17. The non-transitory computer-readable storage medium of claim 16, wherein the instructions to determine whether a path has been established between the source and destination comprise instructions that, when executed by the processor, cause the processor to:
- wait to determine whether a path has been established between the source and destination until a plurality of flow rules marked with a same transaction number as the flow rule are received, wherein the flow rules were marked with the same transaction number by the SDN controller.

18. The non-transitory computer-readable storage medium of claim 16, wherein the instructions to determine whether a path has been established between the source and destination comprise instructions that, when executed by the processor, cause the processor to:
- if initially determined that a path has not been established between the source and destination, wait for a period of time specified by a timeout value and then determine whether a path has been established between the source and destination.

19. The non-transitory computer-readable storage medium of claim 15, wherein the instructions comprise instructions that, when executed by the processor, cause the processor to:
- determine whether a service function chain policy specified by a network invariant is implemented correctly by (1) constructing a path based on a plurality of flow rules having a same transaction number, and (2) determining whether the constructed path passes through service function instances of the service function chain policy in an order specified by the service function chain policy.

20. The method of claim 19, wherein the instructions comprise instructions to:
- determine physical addresses of the service function instances by querying a logical-to-physical mapping database in the SDN controller, wherein the physical addresses are used to determine whether the path passes through the service function instances in the order specified by the service function chain policy.

* * * * *